United States Patent [19]
Hamilton

[11] 3,970,124
[45] July 20, 1976

[54] METHOD AND APPARATUS FOR SEVERING AND MARKING TREES

[75] Inventor: Douglas D. Hamilton, Mount Royal, Canada

[73] Assignee: Logging Development Corporation, Montreal, Canada

[22] Filed: June 27, 1975

[21] Appl. No.: 591,040

[30] Foreign Application Priority Data
July 3, 1974  Canada .............................. 203948

[52] U.S. Cl. .................................. 144/3 D; 101/4; 144/3 N; 144/34 E
[51] Int. Cl.² ...................... A01G 23/08; B44B 5/00
[58] Field of Search ............... 101/4, 226, 227, 228, 101/4 S; 118/9; 144/2 Z, 3 D, 34 R, 34 E, 3 N, 309 AC, 209 R, 328; 83/928

[56] References Cited
UNITED STATES PATENTS

| | | | |
|---|---|---|---|
| 3,540,501 | 11/1970 | Jonsson ............................ | 144/34 E |
| 3,797,539 | 3/1974 | Moser et al. ....................... | 144/3 D |
| 3,812,893 | 5/1974 | Ervast ............................. | 144/209 R |
| 3,848,646 | 11/1974 | Miles .............................. | 144/3 N |

Primary Examiner—Othell M. Simpson
Assistant Examiner—W. D. Bray
Attorney, Agent, or Firm—Shanley, O'Neil and Baker

[57] ABSTRACT

A method and apparatus for marking and severing a tree trunk, such apparatus including a grapple for grasping a tree and a severing device spaced therefrom for severing the tree. A marking device is located at a position on the side of the grapple device opposite to that of the severing device and in selected spaced relation with the latter to effect a mark on the tree wherein a subsequent severing operation is to be effected. The spacing between the marking and severing device indicates the length of log to be severed. The marking device is actuated automatically upon effecting a severing operation such that during severing the mark is effected and which may be subsequently utilized visually to indicate appropriate positioning for the subsequent severing operation. Alternatively, automatic means may be utilized to detect the mark and such automatic detection actuating suitable means to effect the desired severing operation. Stripper arms are included on the device for removing limbs from the tree as it is propelled endwise by a tree propelling means consisting of feed rolls or the like.

10 Claims, 4 Drawing Figures

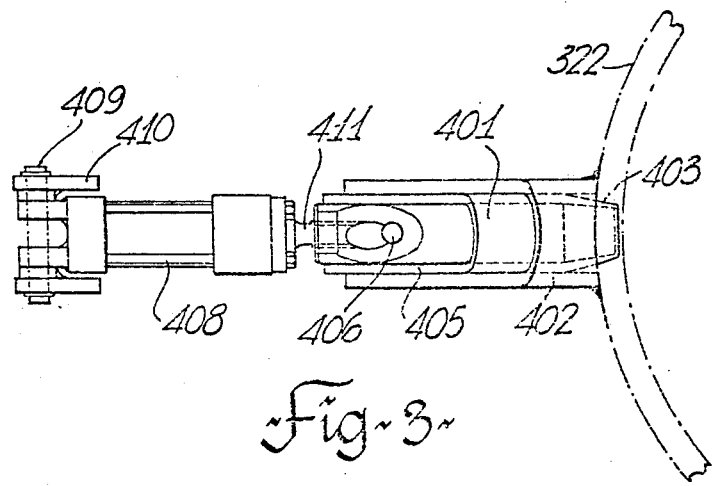
Fig-3-
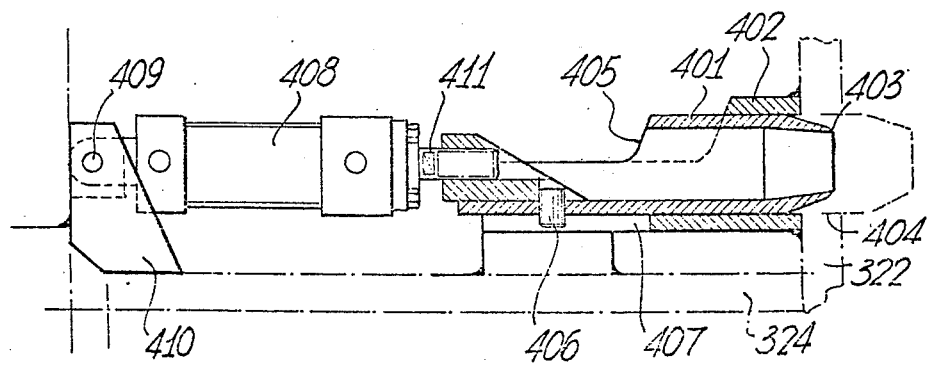
Fig-4-

METHOD AND APPARATUS FOR SEVERING AND MARKING TREES

This invention relates to a method and apparatus for marking and serving a tree trunk. The invention also relates to a processing assembly for a tree harvester wherein the processing assembly includes means for severing a tree trunk and means for marking the tree trunk at a position spaced from the position at which it is severed by the severing device.

Felling heads for mobile equipment are well known wherein the felling head includes a grapple for grasping the trunk of a tree and a severing device for cutting the trunk from its roots. The grapple and severing device, commonly referred to as a felling head, can be controllably tilted to fell the standing tree and one such device is disclosed in Canadian Pat. No. 836,313 issued Mar. 10, 1970. In order to stabilize the tree, heeling devices may be incorporated in the felling head or on the boom and with regard to the latter, reference may be had to Canadian Pat. No. 840,775 issued May 5, 1970. In some instances, felling heads incorporate a stripper delimber for removing limbs from the tree trunk and as an example of such, reference may be had to Canadian Pat. No. 833,312 issued Feb. 3, 1970 and entitled "Tree Harvesting Machine and Method".

In applicant's pending U.S. application Ser. No. 537,459 filed Dec. 30, 1974 entitled "Harvester Processor Assembly", there is disclosed a felling head incorporating a stripper delimber and means for propelling the tree through the delimber. The apparatus is used to sever a tree from its stump and thereafter remove the limbs and buck the tree into selected lengths (normally 8 feet). It is however difficult to always have the logs of substantially equal lengths without resorting to complicated and costly equipment.

Accordingly a principal object of the present invention is to provide a method and apparatus for marking the trunk at positions wherein the trunk is to be severed.

In accordance with one aspect of the present invention there is provided in an apparatus having a tree gripping device and a severing device for severing a tree into discrete lengths, and improvement comprising: tree marking means mounted on the apparatus for placing a mark on the trunk of the tree at a position spaced from the severing device and means actuating the marking device in response to severing of the tree, said mark on the trunk indicating the position to subsequently sever the trunk providing a log of preselected length.

In accordance with a further aspect of the present invention there is provided a method of severing trees into selected lengths comprising: severing the trunk of the tree and in response to said severing operation, marking the trunk at a position spaced from the severing device indicating the position for effecting a subsequent severing operation to provide a log of selected length.

The invention is illustrated by way of example in the accompanying drawings wherein:

FIG. 3 is a top plan view of a marking device secured to the tree processing assembly illustrated in FIGS. 1 and 2; and FIG. 4 is a side partial sectional elevational view of the marking device.

Figure 1:
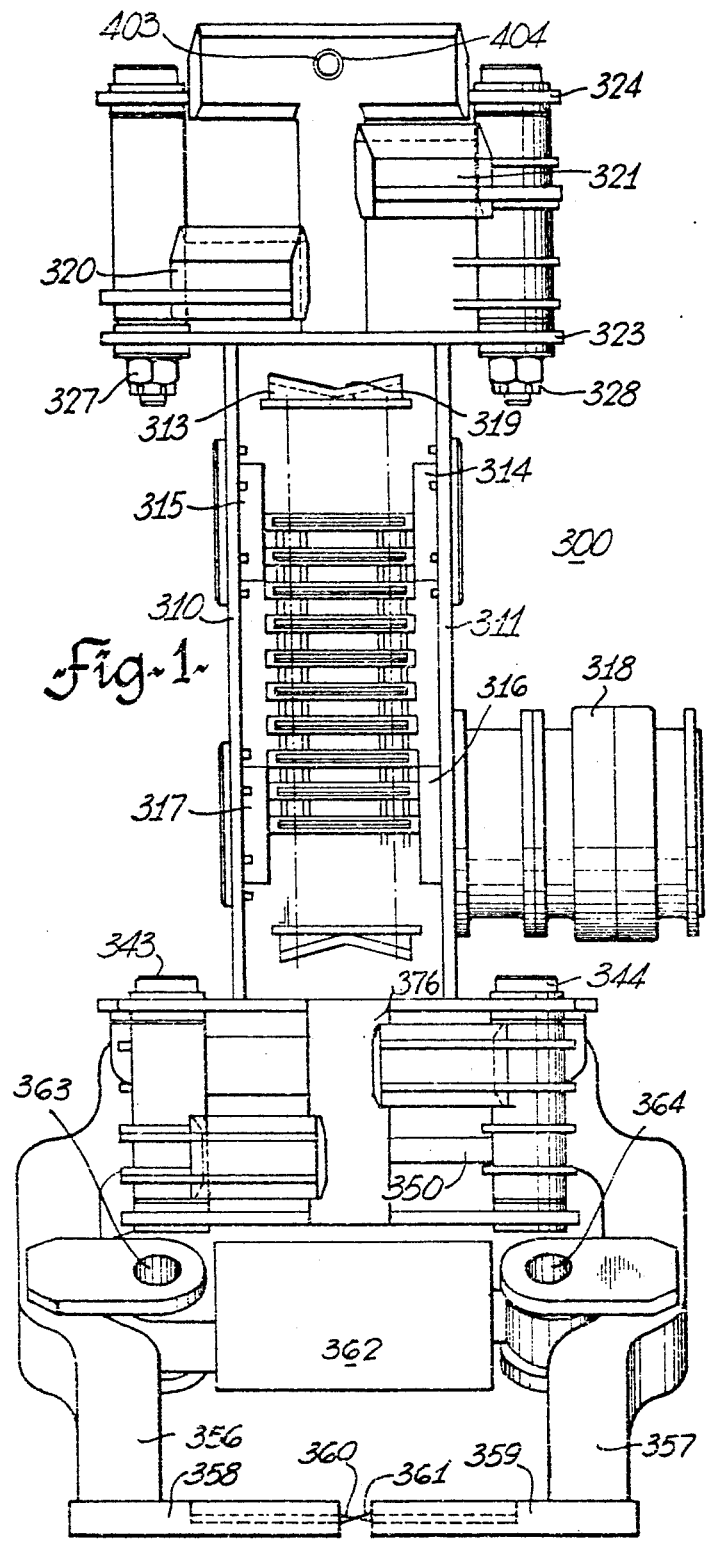
FIG. 1 is a front elevational view of a tree processing and severing device.
Figure 2:
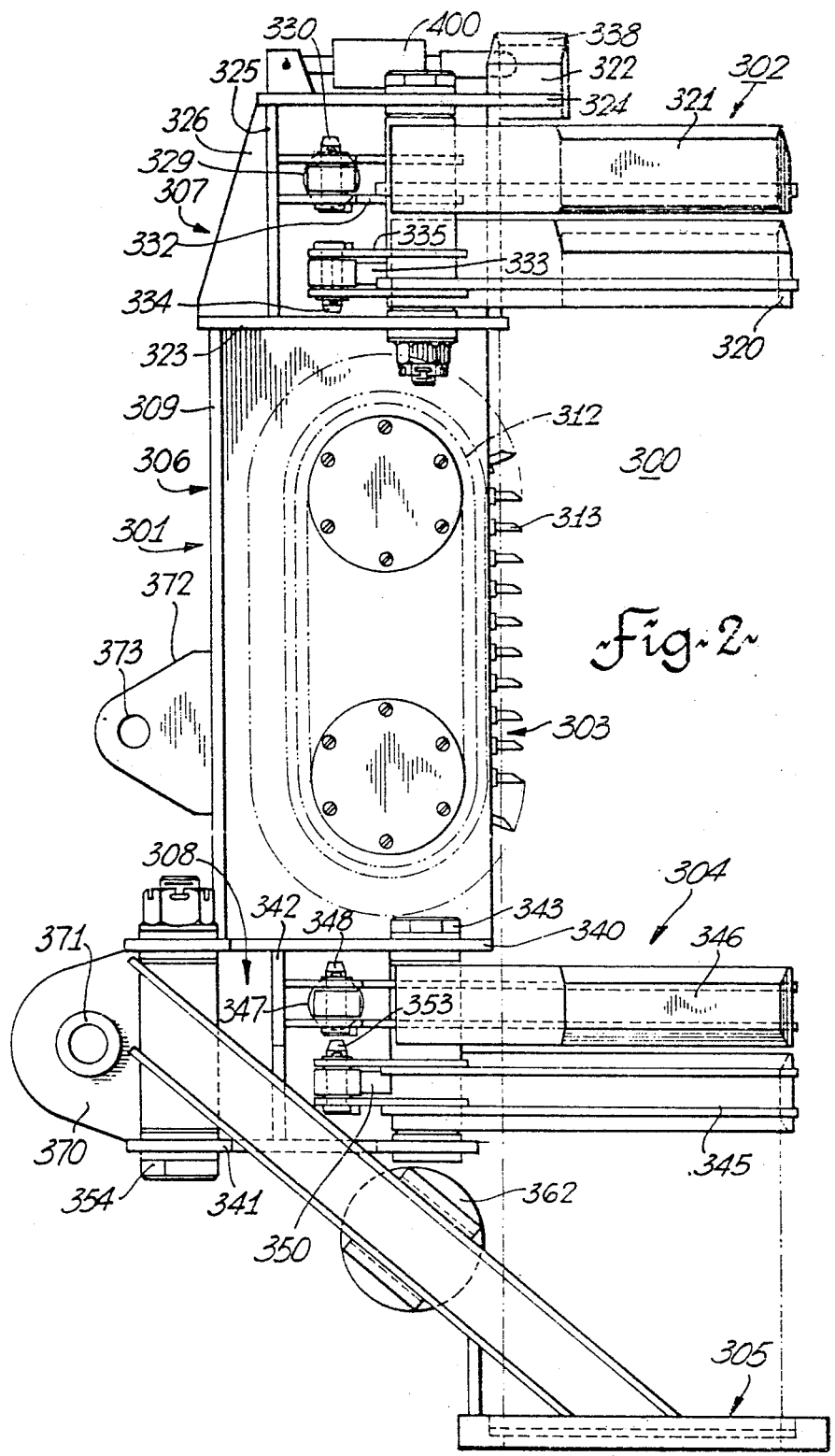
FIG. 2 is a side elevational view of the device illustrated in FIG. 1.

Referring now in detail to the drawings, illustrated in FIGS. 1 and 2 is a processing assembly 300 adapted to be pivotally mounted on the free end of an extendible and retractable boom carried by a mobile vehicle. A mobile tree harvester incorporating the processing assembly is disclosed in applicant's aforementioned pending application Ser. No. 537,459. The processing assembly 300 consists essentially of a rigid frame 301 having mounted thereon a stripper delimber 302, a tree propelling means 303, a grapple 304 and a tree severing shear 305. In accordance with the present invention, a tree marking device 400, to be described in detail hereafter, is mounted on the frame and has a movable member engageable with a tree grasped by the grapple for effecting a marking on the tree to indicate the position for a subsequent severing operation.

The rigid frame 301 has a central U-shaped channel section 306 closed respectively at opposite ends by cap members 307 and 308. The channel-shaped center section 306 has a rear wall or web 309 and a pair of spaced-apart flanges 310 and 311.

The tree propelling means 303 is mounted within the U-shaped channel 306 and consists of an endless belt-type member 312 extending longitudinally within the channel and having a plurality of cleats 313 on the outer surface thereof. One end of endless belt 312 passes around an idler or sprocket mounted by journals 314 and 315 in respective flanges 310 and 311 of the channel frame. The other end of the belt passes around a sprocket journalled by bearings 316 and 317 mounted on the respective flanges 311 and 310 and driven by a hydraulic motor 318. The cleats 313 as seen in FIG. 1 have an outer V-shaped sharpened edge 319 which projects slightly beyond the flanges 310 and 311, as seen from FIG. 2, for engaging along one length of the belt a tree to be propelled in a manner as will be described hereinafter. The journals 314 and 315 may be adjustably mounted on the flanges 310 and 311 for adjusting tension in the belt 312 in any conventional manner.

The assembly 307 consists of a weldment of plates providing effectively a box-like unit on which are mounted stripper delimber members 320, 321 and 322, one of which is fixed and the other two movable. The box-like member has a first plate 323 secured as by welding or the like to the U-shaped channel member 303 and a second plate member 324 spaced therefrom. These plates project laterally beyond the flanges 310 and 311 and are interconnected by further plates such as 325 rigidly secured thereto and reinforced by gusset members 326. The plates 324 and 325 have aligned apertures respectively, on opposite sides of the U-shaped channel 306 receiving pivot pins 327 and 328 on which are mounted stripping delimber arms 320 and 321. Each delimber arm has an arcuate cutting edge (as viewed in top plan view) for removing limbs from a tree while the tree is propelled endwise between the arms. The arms 320 and 321 are movable toward and away from one another by a hydraulic cylinder 329 pivotally attached at one end by pin 330 to the frame 307 and at the other end by a pin to a lug 332 secured to the arm 321. Movement of the arms 320 and 321 is synchronized by a link 333 connected at opposite ends by pivot pins 334 and lugs 335 to respective arms 320 and 321. The delimber arm 322 is rigidly secured to the plate 324 of member 307 and has an arcuate cutting edge 338 facing in the same direction as the arcuate cutting edges of arms 320 and 321. A stripper delimber of this general type is disclosed in U.S. Pat. No. 3,443,611 issued May 13, 1969 to Karl-Gunnar Jörgensen. The delimber member 322 which is rigidly secured to the frame also provides a heeling device and a plate 376 secured to cap member 308 provides a further heeling device.

From the foregoing it can be seen the unit 307 provides effectively the tree processing assembly designated 302. The unit 307 is illustrated rigidly attached to the channel members 306 but if desired, it can be constructed so as to be detachably mounted as, for example, by bolting plate 323 to a further similar plate which is rigidly secured, as by welding or the like, to the end of the channel member 306. In such an arrangement spacers may be inserted between the plates and thereby adjustably vary the distance between the delimber 302 and grapple 303. The assembly 307 might also be slidably mounted for movement longitudinally along the channel 306. Movement in such instance effectively would be in a direction toward and away from the severing device and could be effected by a pair of hydraulic cylinders connected respectively at opposite ends to the channel 306 and cap member 307. It will also be evident to those skilled in the art cutting members 320, 321 and 322 may be replaced by a pair of grapple arms pivotally mounted on the frame by respective pins 327 and 328 thereby providing a grapple for grasping a tree.

The assembly 308 mounted at the opposite end of the U-shaped channel 306 provides a mounting for the grapple 304 and tree cutting device 305. The assembly 308 is a box-like member consisting of a first plate 340 rigidly secured, as by welding or the like, so the U-shaped channel 306 and a second plate 341 spaced therefrom and interconnected thereto by a series of further plates as, for example, 342. The plates 340 and 341 have a first pair of aligned apertures respectively on opposite sides of the member 306 for receiving respective pivot pins 343 amd 344 and a pair of grapple arms 345 and 346 are pivotally mounted on the assembly 308 by such pivot pins. The grapple arm 346 is pivoted about the pin 344 by a hydraulic power cylinder 347 connected at the cylinder end by a pin 348 to a lug secured to the flange 342 and at the cylinder end by a pin and lug (not shown) to the arm 346. The arm 345 is moved by a synchronizing link 350 pivotally connected respectively at opposite ends by pivot pins 353 and lugs projecting from the respective arms 346 and 345.

The plates 340 and 341 are provided with a second pair of aligned apertures located on opposite sides of the channel member 306 for receiving respective ones of a pair of pivot pins 354. A pair of arms 356 and 357 are mounted on the assembly 308 by respective ones of pivot pins 354 and mounted on the free end of such arms are respective shear mounting plates 358 and 359 which have cutting blades 360 and 361 attaached thereto. The arms 356 and 357 are interconnected by a hydraulic power cylinder 362 for moving the shear blades toward and away from one another respectively to sever and receive a tree therebetween. The cylinder portion of the hydraulic cylinder 362 is connected by a pivot pin 363 to the arm 356 and the piston portion is pivotally connected to the arm 357 by a pivot pin 364. One or both of the pivots 354 includes a stop (not shown) limiting the open position of the arm. Alternatively, stops may be provided and which are secured to the assembly 308 for engaging the respective arms 356 and 357 to limit the open position of the same.

For mounting the assembly on the free end of a boom there is secured to the frame 308 a pair of lugs 370 having aligned apertures 371 therein to receive a pivot pin. Similarly, a pair of lugs 372 are secured to the web 309 of channel 306 and have aligned apertures 373 for receiving a further pivot pin of a tilt control device.

As will be evident from the foregoing and clearly seen in the drawings, each of the processing assembly 302, grapple 304 and tree severing shear 305 have a pair of jaw members movable away from and toward a common plane respectively to receive and engage the trunk of a tree therebetween. The processing assembly 302, which is a stripper delimber, and the grapple 304 and the shear 305 are located at positions spaced longitudinally along the tree. The grapple 304 and shear 305 have arms pivotally mounted on the frame 308 by pivot pins disposed in a common plane perpendicular to the plane parallel to the length of a tree grasped between the jaw members of the respective delimber, grapple and shear assemblies. By such an arrangement the shear blade arms 356 and 357 may be removed and the remaining assembly used as a grapple. In such instance the tree propelling means 303 may be omitted from the channel member 306.

The frame 308, as previously described with respect to frame 307, may be detachably mounted on the channel 306 permitting removal of the same for replacement in the event of failure during use in field logging operations. Such detachable connection may be provided by having a further plate similar to plate 340 rigidly secured as by welding to the end of channel 306 and securing plate 340 thereto by bolt and nut assemblies.

The tree marking assembly 400 consists of a tubular punch member 401 reciprocally mounted in a sleeve 402 secured to plate 324 and member 322. The marking member 401 is a tubular member having a sharpened leading edge 403 which passes through an aperture 404 in member 322 and projects therebeyond to engage a tree grasped by the arm members 320 and 321. The marking member 401 effectively is a hollow type punch and material gathered interiorly thereof through a punching operation is ejected by subsequent punching operations through an aperture 405 formed in the sleeve. In order to maintain the opening 405 at an appropriate position for ejection of the debris, rotation of the marker 401 in sleeve 402 is prevented by a guide pin 406 reciprocally movable in a slot 407 formed in a wall of the guide member 402. Reciprocal movement of the member 401 is effected by a hydraulic cylinder 408 anchored at one end by a pin 409 to a bracket 410 secured to plate 324. The opposite end of the hydraulic cylinder assembly 408, i.e. piston rod 411, is secured in any convenient manner to the marking member 401. The marking member 401 is preferably detachably secured to the piston rod 411 permitting replacement of the marking member.

The marking member 401 is moved in a direction to the right as viewed in FIGS. 2 and 4 punching a small hole in the tree and which is utilized visually to indicate the position at which the trunk should subsequently be severed to provide a log of selected length. The marking member is moved simultaneously with the severing operation and this is accomplished by having a common fluid supply to hydraulic cylinders 362 and 408. Accordingly, when the shear jaws are actuated to effect a severing operation, the marking member 401 is moved to the right piercing the surface of the tree and, upon opening of the shear blades after a severing operation, the marking device 401 is retracted. The tree held by the grapple 304 is then propelled endwise by the feed means 303 during which time the delimber 302 removes the limbs from the trunk. The operator observing the mark punched in the tree stops the feed means to effect a further severing operation when the previously made mark is substantially in alignment with the shear blades. In the event automatic operation is required, sensing means may be mounted on the shear blades detecting the presence of the aperture formed by the punch and such sensing means may be utilized to effect automatic control of the drive and severing operation. For automatic sensing the punch can readily be modified to impale an object into the surface of the tree which could be detected by sensing means. For example, a metal object such as a small pin could be driven into the tree trunk by the punch and detected magnetically by a sensor mounted on the shear. The magnetic detection would then be utilized to actuate the shearing unit. Alternatively, a dye may be appropriately positioned on the tree by the marking mechanism and subsequently detected by a sensing mechanism. It will be obvious to anyone skilled in the art various means for marking and detecting such marking may be utilized well within the skill of anyone in the art.

The marking punch alternatively or additionally may be utilized to place a timber mark on the log for subsequent identification depending upon the registered timber mark. For this a punching or burning operation may be utilized impressing on the surface of the log the desired timber mark.

I claim:

1. In an apparatus having a tree gripping device and a severing device for severing a tree into discrete lengths, the improvement comprising: tree marking means mounted movably on said apparatus for placing a mark on the trunk of the tree, grasped by the gripping device, at a position spaced from the severing device, and means actuating the marking device for placing a mark on the tree trunk in response to severing of the same by said severing device, said mark on the trunk indicating the position to subsequently sever the trunk providing a log of selected length.

2. The improvement as defined in claim 1 wherein said marking device is movable in a direction transverse to the length of the tree.

3. The improvement as defined in claim 2 wherein said movable marking device comprises a punch-like member for impaling the surface of the tree.

4. The improvement as defined in claim 3 wherein said punch-like member comprises a tubular sleeve having an open, sharpened end engageable with the tree.

5. The improvement as defined in claim 1 including a heeling device engageable with a tree grasped by said gripping device and located at a position longitudinally along the tree spaced from said gripping device in a direction opposite to that of the severing device and wherein said marking device is mounted on said heeling device.

6. The improvement as defined in claim 5 wherein said severing device, heeling device and grapple are mounted on a common frame.

7. The improvement as defined in claim 5 wherein said heeling device includes a knife edge for removing limbs from the tree.

8. The improvement as defined in claim 6 including stripper delimber means mounted on said frame and means for propelling a tree endwise through said delimber means.

9. An apparatus for use in processing trees comprising:
 a. an elongated frame adapted to be moved to a position extending vertically along a trunk of a standing tree;
 b. limb-shearing means mounted on the upper end of the frame and including a pair of arcuate, pivotally mounted arms;
 c. tree marking means movably mounted on said frame adjacent said limb-shearing means;
 d. driven endless conveying means mounted on the frame below the limb-shearing means and having formations thereon projecting therefrom for tractively engaging the trunk of the tree to propel the same endwise past the limb-shearing means;
 e. a tree severing means comprising a pair of arms pivotally mounted on the frame adjacent the lower enc thereof and terminating in free outer end portions, a pair of shear blades secured to respective ones of said outer free end portions for severing the trunk of the tree embraced by said limb-shearing means; and
 f. hydraulic power cylinder means connected to said shear blade arms for moving the same to sever the trunk of the tree and means correlating movement of the marking means and said shear blade arms.

10. An apparatus for use in processing trees comprising:
 a. an elongated frame adapted to be moved to a position extending vertically along the trunk of a standing tree;
 b. limb-shearing means mounted on the upper end of the frame and including a pair of arcuate, pivotally mounted arms, each having a cutting edge for severing limbs from a tree as it is propelled endwise;
 c. driven endless track type conveying means mounted on the frame below the limb-shearing means and having formations thereon projecting therefrom for tractively engaging the trunk of the tree to propel the same endwise past the limb-shearing means;
 d. tree severing means mounted on the frame adjacent the lower end thereof and movable for severing the trunk of the tree embraced by said limb-shearing means;
 e. tree marking means movably mounted on said frame at a position spaced from said tree severing means for marking the tree trunk indicating the position to subsequently sever the tree providing a log of selected length;
 f. means connected to the tree marking means to effect movement of the same; and
 g. means actuating movement of the marking means in response to actuation of the tree severing means.

* * * * *